United States Patent Office 3,418,874
Patented Dec. 31, 1968

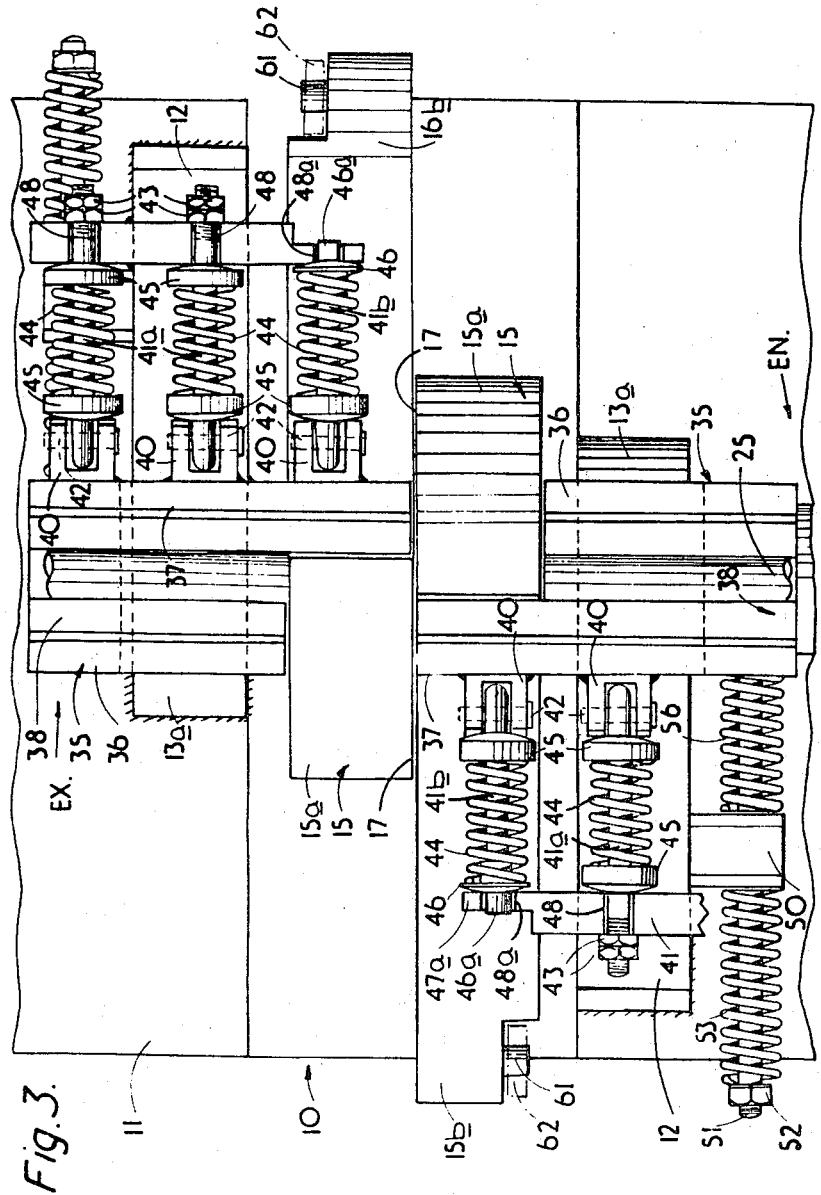

3,418,874
STOCK SHEAR HAVING A PAIR OF
PIVOTAL SHEAR BLADES
Joseph Lees, Wednesbury, England, assignor to Garringtons Limited, Darlaston, England, a British company
Filed Aug. 26, 1966, Ser. No. 575,458
Claims priority, application Great Britain, Sept. 3, 1965, 37,716/65
10 Claims. (Cl. 83—456)

ABSTRACT OF THE DISCLOSURE

A shear for bar stock for use with a power press, comprising a generally flat base, engageable with the base of the press, two shear blades being mounted on said flat base to provide a secateur type of action, the shear blade being mounted in generally L-shaped holders which are pivotally mounted on said flat base at the junction of their limbs, a blade being carried in one limb of each holder and the other limbs of the holders extending generally parallel to, and spaced above, said flat base and being engageable by the moving ram of the press to cause pivotal movement of the blades and hence shearing of the stock. A resiliently mounted stock guide means may be provided to support the stock during shearing and to absorb the kick produced by the shearing action.

---

This invention relates to shearing devices for metal, and especially to shears for cutting lengths of bar stock into slugs for forging or other metal working operations.

In the past slugs have been cut from bar stock either by a sawing operation or by means of a guillotine having a single blade moving rectilinearly. In the case of sawing, a clean square cut is obtained but it is an expensive operation, whereas guillotining is much more economical but has the disadvantages of producing a rough cut with some deformation of the parent bar stock and the slug adjacent the cut.

It is the object of the present invention to provide an economical shear which will provide a clean cut.

A shear constructed according to the present invention will now be described in detail by way of example with reference to the accompanying drawings wherein:

FIGURE 3 is a fragmentary plan view of the shear of FIGURE 1, with parts omitted for clarity.

Figure 1:
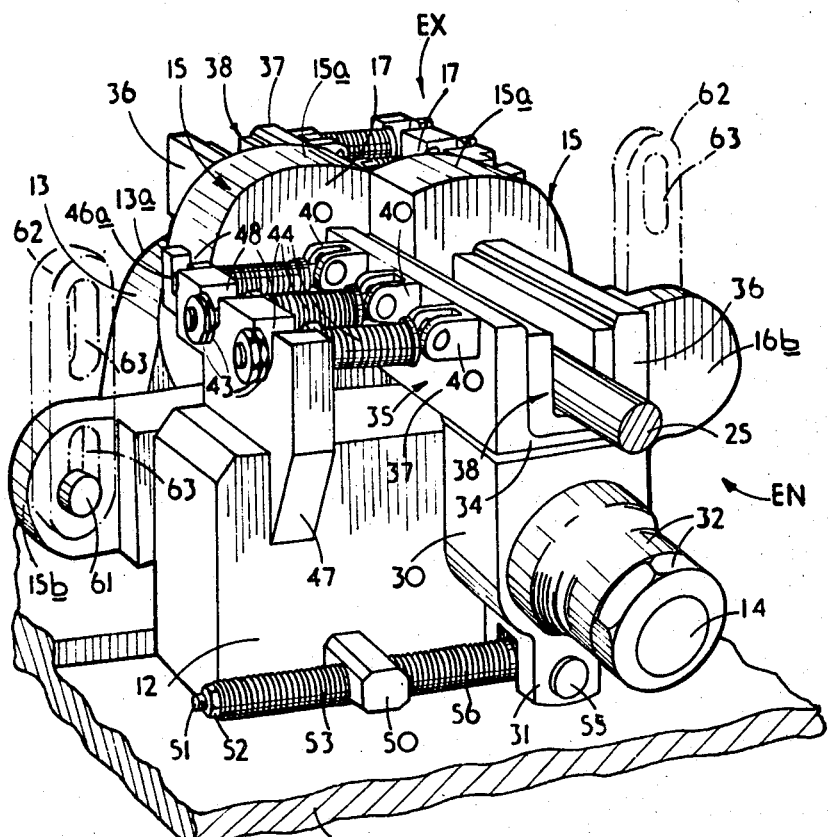
FIGURE 1 is a perspective view of a shear embodying the invention.

Referring now to the drawings, the shear indicated generally at 10, is adapted to be operated by a forging press but the shear may be operated by any other convenient means.

The shear comprises a generally rectangular base plate 11 having mounted thereon two pedestal blocks 12 which are arranged in staggered relationship, parallel to, and spaced apart from, each other, as shown in FIGURE 3. The blocks 12 are generally rectangular in front elevation, but one side 13 of each of them is inclined inwardly and upwardly and merges with the top of the block in a smooth curve. Each block 12 is apertured adjacent its side 13 and a shaft 14 is rotatably mounted in the apertures; between the pedestal blocks the shaft 14 carries two shear blade holders 15.

Each shear blade holder 15 is generally L-shaped in front elevation and is apertured at approximately the intersection of its two limbs 15a and 15b. As suitable bearing shell is pushed with an interference fit into the aperture in each shear blade holder 15, the latter being pivotally mounted thereby on the shaft 14.

One limb 15a of each shear blade holder extends substantially vertically whilst the other limbs 15b extend substantially horizontally. The limbs 15b are longer than the vertical limbs so that a suitable mechanical advantage is obtained for operation of the shear blades, hereinafter to be described. This mechanical advantage may suitably be 3:1 which enables convenient dimensions of the limbs 15a and 15b to be used.

The two shear blade holders 15 are mounted side by side upon the shaft 14 and are arranged so that the adjacent side faces 17 of the limbs 15a are very close to, or in contact with, each other. The horizontal limbs 15b extend away from the shaft 14 in opposite directions.

Figure 4:
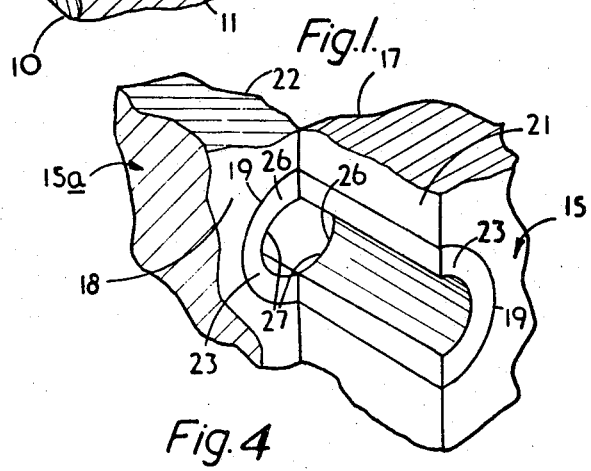
FIGURE 4 is a fragmentary perspective view, to an enlarged scale, showing the cutting blades of the shear of FIGURE 1.

Referring particularly to FIGURE 4, the vertical limbs 15a have approximately semi-cylindrical recesses 19 formed in their facing or inner edges 21. These recesses 19 extend across the whole width of the edges 21 and secured in each recess is a cutting blade 23. Each blade 23 is made from hardened steel and is in the form of half of a hollow cylinder which has been split lengthwise across a diameter, the inner radius of the shear blades being approximately the same as the radius of bar stock 25 to be cut. The shape of the shear blades depends upon the shape of the stock to be cut and if the stock to be cut were square in cross section then the shear blades would be of channel section.

Figure 2:
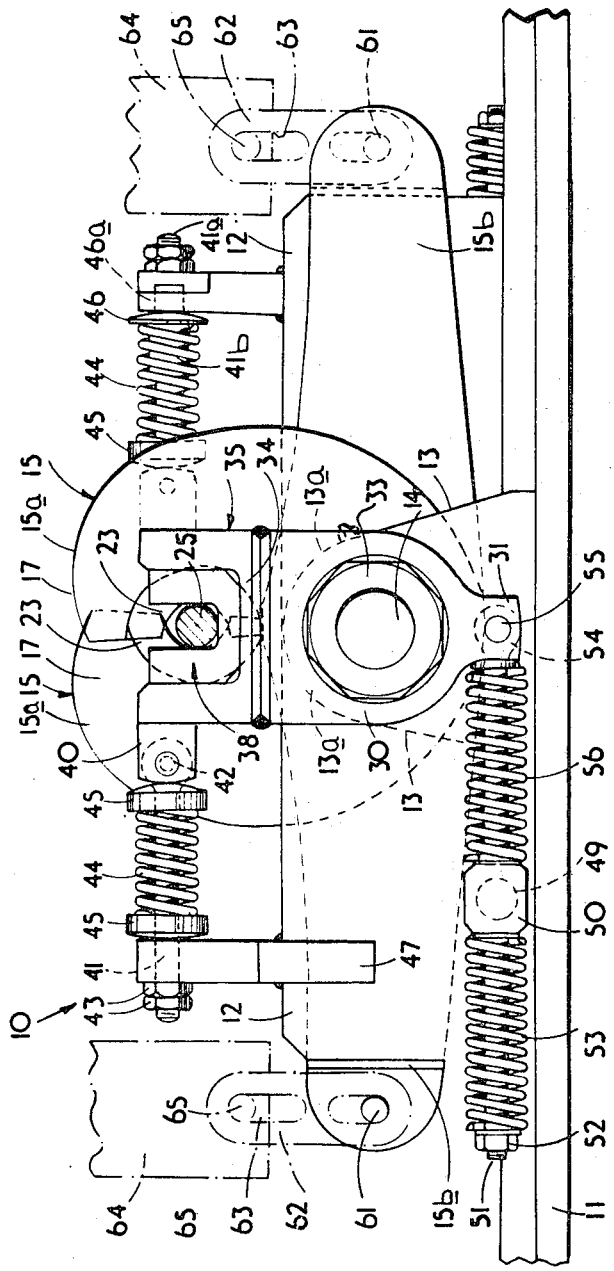
FIGURE 2 is a front elevation on an enlarged scale of the shear shown in FIGURE 1.

The adjacent semi-circular end faces 26 of the shear blades 23 are co-planar with the side faces 17 of the vertical limbs 15a in which they are mounted, hence the end faces 26 slide over each other when the shear blade holders 15 are rotated in opposite directions about the shaft 14 from the positions shown in FIGURE 2. These adjacent end faces 26 are herein referred to as the "cutting faces" of the blades and the inner semi-circular edges 27 of the cutting faces 26 are termed the "cutting edges."

The shaft 14 extends outwardly from the pedestal blocks 12 and a bracket 30 is pivotally mounted on each of the ends of the shaft 14. Each bracket has its bottom end rounded and a U-shaped lug 31 is formed integrally with and projects downwardly from, the middle of the rounded bottom end, as clearly shown in FIGURE 2. Each bracket 30 is provided with an aperture within which a bearing is secured, within which the shaft 14 is received, so enabling the brackets 30 to pivot about the shaft. Axial movement of the bracket 30 on the entry side EN of the shear 10 is prevented by the nuts 32 on the shaft whilst axial movement of the bracket on the exit side EX of the shear is prevented by an enlarged head (not shown) formed on the shaft 14.

Each bracket 30 has secured to the upper end thereof the base 34 of a channel section support member 35. The vertical limbs 36, 37 of the member 35 are of unequal length (measured along the length of the channel), the limb 37 being longer than the limb 36 by a distance equal to the thickness of a shear blade holder 15, as shown in FIGURE 3. Bolted within each member 35 is a further channel section member 38 which has vertical limbs of the same lengths as those of the support member 35. The members 38 constitute the stock guides of the shear and are made of a relatively hard metal, such as a steel of E.N. 16 specification so damage of the stock during a shearing operation is avoided as hereinafter to be explained. The internal dimensions of the stock guides 38 depend on the size of stock to be sheared and the guides 38 are removable so that different sized stock guides may be inserted within the support members 35.

Referring now to FIGURES 1 and 3, the longer limb 37 of each support member 35 has three bifurcated brackets 40 welded to the outer side thereof. A guide rod 41 is pivotally secured to each bracket 40 by an anchor pin 42 which is engaged within an eye on the guide rod 41. The outer two guide rods 41a of each set of three rods on a member 35 are identical and each has a screw thread provided on its free end with which lock nuts 43 are engaged. The guide rod 41b of each set of guide rods which is closest to the shear blade holders 15 is shorter than the rods 41a and is not threaded. A coil compression spring 44 is carried by each guide rod 41 and cups 45 are provided between the ends of each spring 44 and its associated brackets, and these springs 44 constitute the buffer springs of the stock guide. Further cups 45 are provided between the other ends of the springs 44 on the rods 41a and bracket 47 welded to the pedestal blocks 12. A cup 46 is provided between the other end of the spring 44 on each rod 41b and is of a different shape than the cups 45 having an integrally formed tubular shank 46a within which the free end of the rod 41b engages whilst the outer surfaces of the shank 46a engage in a slot 48. Slots 48 in the upper edge of the brackets 47 receive the outer ends of the rods 41a so that the brackets are between the cups 45 and the nuts 43. At a position adjacent the shear blade holders each bracket 47 is of reduced thickness and is provided with a slot 48a to receive the shank 46a of the cup 46. This portion of reduced thickness and the associated shorter guide rods 41b which are not provided with lock nuts provide more clearance for the projections 64 provided on the ram of the forging press which the shear is adapted to be operated by, as to be described in more detail hereinafter.

The brackets 47 are of generally L shape, as shown in FIGURE 1, and are engaged within shallow slots formed in the tops and sides of the blocks 12.

Adjacent to the bottom edge of each block 12 is pivotally journalled the shank 49 of a pivot member 50. The pivot member 50 is provided with a through bore extending transversely of its pivot axis and a guide rod 51 is slidable in the bore. One end of the rod 51 is threaded and carries a lock nut 52 and between the lock nut 52 and the member 50 there is mounted a coil compression spring 53. The other end of the guide rod 51 is provided with an eye 54 which is pivotally connected to the U-shaped lug 31 on the bracket 30 by an anchor pin 55. A further coil compression spring 56 is mounted on the rod 51 between the member 50 and the eye 54. A similar arrangement is provided on each block 12 and these springs 53 and 56 constitute the centering springs of the guide means.

The support members 35 carrying the stock guides 38 can rock about the pivot axis of the shear blade holders 15, i.e. about the shaft 14, and are biased to their rest positions by means of the springs 44, 53, 56. These springs, and particularly the springs 44, serve to permit and cushion sideways movement of the support members 35 due to movement of the bar stock 25 during a shearing operation.

In operation, the shear 10 is located on the base plate of a forging press (not shown) and the movable ram of the press is provided with two projections 64 (shown in chain dotted outline in FIGURE 2) which are arranged to engage with the supper surfaces of the horizontal limbs 15b of the shear blade holders. The bear stock 25 to be sheared is inserted into the stock guide 38 on the entry side EN of the shear 10 and is pushed axially through the open shear blades 23 and into the stock guide 38 on the exit side EX of the shear 10 until there is the required length of stock 25 between the blades 23 and the end of the stock.

The forging press is then set in operation and as the ram thereof descends the projections 64 on the ram engage the outer ends of the horizontal limbs 15a and cause the shear blade holders 15 to rotate in opposite directions. The bar stock 25 to be sheared is thus gripped between the shear blades 23 and, as the press ram continues to descend, the cutting faces 26 of the blades 23 begin to overlap and the cutting edges 27 begin to approach each other, thereby cutting the bar. As the shear blades 23 cut the bar they cause it to "kick" so that, in FIGURE 1, the stock at the entry side EN of the shear blades moves to the left whilst the stock at the exit side EX of the shear blades moves to the right. This kick is absorbed by the buffer springs 44 provided on each support member 35 and the latter are then returned to their rest position by the springs 44, 53, 56, as described above.

When the ram of the press begins to ascend the shear blades are opened, as described below. Each projection 64 on the ram is provided with a pin 65 which projects from one side of the projection in a direction parallel to the shaft 14. At their outer ends the horizontal limbs 15b are of reduced thickness and carry transversely extending pins 61. Each pin 65 on the projections 64 of the ram and the pin 61 on associated horizontal limb 15a are engaged with a link member 62 having slots 63 and shown in chain dotted outline in FIGURE 1. During the descent of the ram, the pins slide along the slots 63 and enable the projections to engage the tops of the horizontal limbs 15b. On raising the ram the pins move and engage the ends of the slots 63 and thus the horizontal limbs 15b are raised and the shear blade holders 15 pivoted about the shaft 14 to open the shear blades 23.

Although hereinbefore the bar stock 25 has been described as being fed into the shear from the side thereof the stock may be fed into the gap between the open blades from above. Moreover, different means may be used for opening the blades.

The cut produced by the shear described above causes very little distortion of the patent stock or of the cut off length, the cut is square with the axis of the bar stock and little or no burr is formed. In addition, due to the fact that the cutting faces of the blades slide over each other, the blades are self sharpening and hence blade life is high and the maintenance cost is low.

In addition, the shear above described is equally suitable for cutting hard and soft metal with the same shear blades. For example, either a relatively soft steel such as an E.N.8 steel or a relatively hard steel such as an E.N.19 or an E.N.24 steel may be sheared in the shear above described whereas with previous shears it has been necessary to pre-heat the harder steel before shearing it. The shear according to the present invention thus avoids this need to pre-heat hard materials and results in a more economical shearing operation.

What I claim then is:

1. A shear for bar stock comprising a generally planar base engageable with the base of a press, two upstanding pedestal blocks carried on said planar base, a shaft, supported in said blocks, extending across, and spaced above said base, two cooperating shear blades, each having a cutting face bounded by a cutting edge, two shear blade holders pivotally mounted on said shaft, each holder having two mutually inclined limbs which extend from said shaft, one limb of each holder carrying one of said blades and said holders being mounted close together on said shaft for pivotal movement thereabout so that said blades pivot about an axis spaced from said cutting edges and extending perpendicularly to the planes of said faces to pass across one another during said movement to bring the cutting edges into engagement with opposite portions of stock to shear the stock, the other limb of each holder extending laterally away from said shaft generally parallel to said base and spaced above said base and being engageable by the moving ram of a press to be moved downwardly by said press to cause said pivotal movement, and stock guide means being provided on said base to hold the stock to be cut by the blades.

2. A shear for bar stock comprising a base, a shaft extending across the base, two cooperating shear blades, each having a cutting face bounded by a cutting edge, two shear blade holders pivotally mounted on said shaft, each holder having two mutually inclined limbs which extend from said shaft, one limb of each holder covering one of said blades and said holders being mounted close together on said shaft for pivotal movement thereabout so that said blades pivot about an axis spaced from said cutting edges and extending perpendicularly to the planes of said faces to pass across one another during said movement to bring the cutting edges into engagement with opposite portions of stock to shear the stock, the other limb of each holder being engageable by power actuated means to cause said pivotal movement, and stock guide means including a stock engaging member pivotally mounted on said shaft and spring means acting on said stock engaging member, against which spring means the stock engaging member is movable in a direction to allow relative movement of the parts of the stock to be sheared.

3. A shear for bar stock according to claim 2, wherein the spring means includes buffer compression springs connected between the stock engaging member and a part fixed to the base of the shear.

4. A shear for bar stock according to claim 3, including centering spring means to urge the stock engaging member into a rest position.

5. A shear for bar stock according to claim 4, wherein the centering spring means includes a guide rod pivotally connected at one end to the stock engaging member and slidably supported adjacent its midpoint in a support member mounted on the base, two compression springs being engaged around the guide rod, one between one end thereof and one side of the support member, and the other between the other end thereof and the opposite side of the support member.

6. A shear for bar stock according to claim 4 wherein two stock engaging members and associated buffer springs and centering springs are provided one on each of the exit and entry sides of the shear.

7. A shear for bar stock according to claim 5 wherein two stock engaging members and associated buffer springs and centering springs are provided, one on each of the exit and entry sides of the shear.

8. A shear for bar stock according to claim 1, wherein the cutting edge of each shear blade is concave.

9. A shear for bar stock according to claim 7, wherein the cutting edge of each shear blade is concave.

10. A shear for bar stock according to claim 9, wherein the stock engaging member is trough shaped.

References Cited

UNITED STATES PATENTS

| | | | |
|---|---|---|---|
| 769,917 | 9/1904 | Prichard | 83—601 X |
| 2,939,353 | 6/1960 | Vickers | 83—199 X |

ANDREW R. JUHASZ, *Primary Examiner.*

U.S. Cl. X.R.

83—589, 600, 605